(12) United States Patent
Macura et al.

(10) Patent No.: US 8,253,744 B2
(45) Date of Patent: Aug. 28, 2012

(54) SYSTEM FOR VIRTUALLY DRAWING ON A PHYSICAL SURFACE

(75) Inventors: Marko Macura, Eindhoven (NL); Thomas Marzano, Eindhoven (NL); Kyriakos Mama, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 421 days.

(21) Appl. No.: 12/442,424

(22) PCT Filed: Sep. 27, 2007

(86) PCT No.: PCT/IB2007/053926
§ 371 (c)(1),
(2), (4) Date: Feb. 25, 2010

(87) PCT Pub. No.: WO2008/041159
PCT Pub. Date: Apr. 10, 2008

(65) Prior Publication Data
US 2010/0149191 A1  Jun. 17, 2010

(30) Foreign Application Priority Data
Oct. 2, 2006  (EP) .................................. 06121615

(51) Int. Cl.
*G06T 15/00*  (2011.01)
(52) U.S. Cl. ........ 345/473; 345/178; 345/474; 345/475; 345/581; 434/155

(58) Field of Classification Search .................. 345/473, 345/474, 475, 179, 581; 434/155
See application file for complete search history.

(56) References Cited

U.S. PATENT DOCUMENTS

| | | | | |
|---|---|---|---|---|
| 5,646,650 A | * | 7/1997 | Miller et al. | 345/179 |
| 6,603,463 B1 | * | 8/2003 | Rising, III | 345/179 |
| 6,801,211 B2 | * | 10/2004 | Forsline et al. | 345/581 |
| 7,136,054 B2 | * | 11/2006 | Wang et al. | 345/179 |
| 7,142,197 B2 | * | 11/2006 | Wang et al. | 345/179 |
| 7,262,764 B2 | * | 8/2007 | Wang et al. | 345/179 |
| 2003/0117408 A1 | | 6/2003 | Forsline et al. | |
| 2006/0028456 A1 | * | 2/2006 | Kang | 345/179 |
| 2006/0084039 A1 | * | 4/2006 | Ryokai et al. | 434/155 |

OTHER PUBLICATIONS

Cao et al, VisionWand: Interaction techniques for Large Displays Using a Passive Wand Tracked in 3D, University of Toronto, ACM, 2003, pp. 173-182.*

* cited by examiner

*Primary Examiner* — Phu K Nguyen

(57) ABSTRACT

The system (13, 15) for virtually drawing on a physical surface of the invention comprises electronic circuitry, wherein the electronic circuitry is operative to detect movements of a physical object over the physical surface and project a drawing (11) corresponding to the movements on the physical surface. The computer program product of the invention enables a programmable device to function as the system of the invention.

8 Claims, 2 Drawing Sheets

SYSTEM FOR VIRTUALLY DRAWING ON A PHYSICAL SURFACE

FIELD OF THE INVENTION

The invention relates to a system for virtually drawing on a physical surface, the system comprising electronic circuitry.

The invention further relates to a computer program product enabling a programmable device to function as a system for virtually drawing on a physical surface.

BACKGROUND OF THE INVENTION

Children are sometimes allowed to draw on a wall of a house with real drawing tools, but these drawings are often difficult to erase and may even require the wall to be repainted. Certain Personal Digital Assistants (PDAs) allow a user to draw on a touch screen using a pen, but this is not suitable for entertaining younger children.

SUMMARY OF THE INVENTION

It is an object of the invention to provide a system for virtually drawing on a physical surface which is more entertaining for younger children.

According to the invention, the object is realized in that the electronic circuitry is operative to detect movements of a physical object over the physical surface and project a drawing, also referred to as painting, corresponding to the movements on the physical surface. By projecting the drawing, e.g. on a wall, a large drawing area can be created and the physical object can therefore also be relatively large, e.g. similar to a real paintbrush. Movements of the physical object may be detected, for example, by using a camera. The electronic circuitry may be able to recognize the shape and/or color of the physical object in the captured images. Erasing may be done with the same physical object, e.g. by selecting an 'erasing' color, or with a special physical object, e.g. called the 'erasing tool'.

In an embodiment, the system of the invention comprises a bucket for holding the physical object. This physical object may resemble a paintbrush and the bucket may resemble a paint bucket.

The bucket may comprise a projector for projecting the drawing on the physical surface. The projector is preferable portable. By integrating it with the bucket, functionality and playfulness can be combined.

The projector may comprise a laser projector. This type of projector is capable of working under sharp angles.

The bucket may comprise a plurality of sensors for detecting a stirring gesture being performed with the physical object in the bucket and the electronic circuitry may be operative to select a color for projecting a drawing corresponding to movements performed after the color has been selected. This provides an easy and playful way of changing the color of the virtual paintbrush. The color may change during the stirring clockwise and counter-clockwise. The color of the bucket and/or the paintbrush may change accordingly.

The system may comprise means for determining a position of the physical surface on which the drawing is currently being projected and a memory for storing and retrieving a drawing associated with said position. For example, the bucket may remember the drawing that has been made in the kitchen and when the bucket is used again in the kitchen the last drawing will appear (like virtual graffiti). The position may be determined using a GPS receiver, but as GPS does not work well inside houses, in-home beacons are preferably used.

The electronic circuitry may be operative to animate the drawing. Animations may be stored in the system and may be triggered as soon as the drawing is sufficiently similar to a predefined shape. A special physical object, e.g. called a "wand", can be used to trigger the animation when the drawing is touched with the special physical object.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
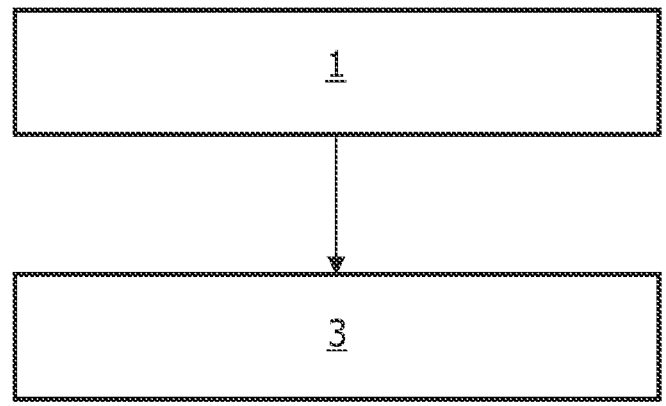
FIG. 1 is a flow diagram of the method of the invention.

The method of the invention comprises two steps, see FIG. 1. A step 1 comprises detecting movements of a physical object over a physical surface. A step 3 comprises projecting a drawing corresponding to the movements on the physical surface.

Figure 2:
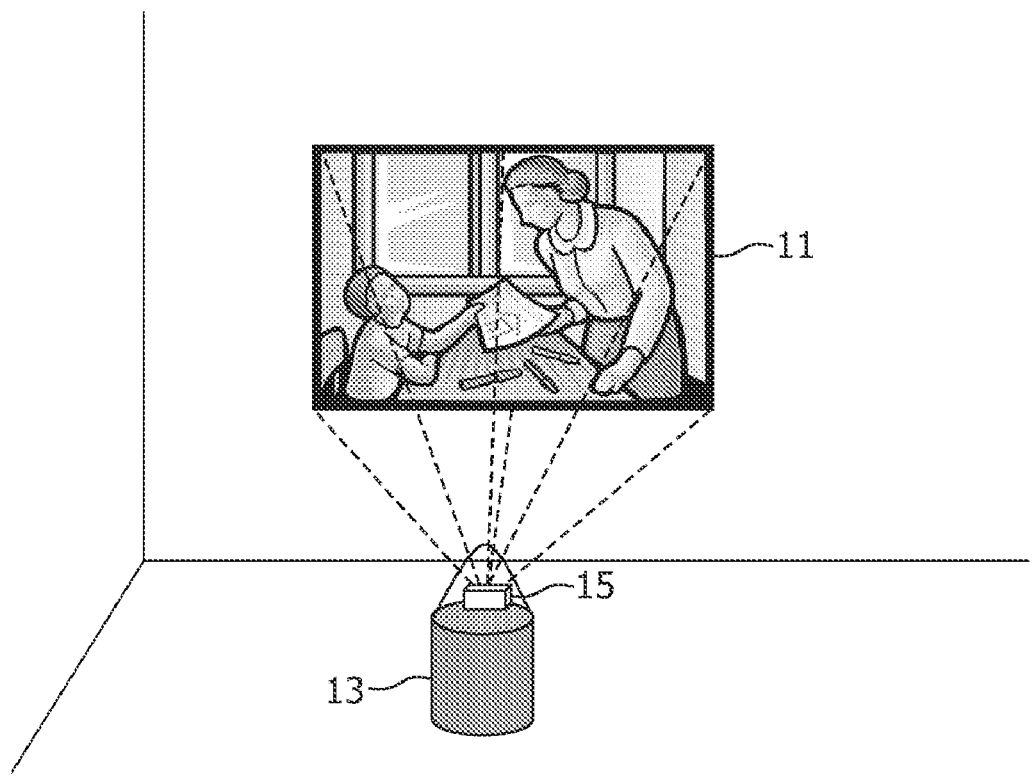
FIG. 2 shows an embodiment of the system of the invention.

FIG. 2 shows an embodiment of the system of the invention, which comprises a bucket 13 with a projector 15. The projector 15 projects an image 11 on a wall. To start painting, a child can put the paint bucket (which also serves to store all the tools) in front of the wall he wishes to paint on. By doing so the laser beamer that is built into the bucket will be able to project images onto the wall. The child then takes out all the tools from the bucket to activate the bucket and the tools. The inside of the bucket lights up into the last color used.

By picking up the brush it will activate and glow. By dipping it in the bucket, the brush will change its color into the same color as the bucket. When the child starts to paint on the wall, the color of the paint will be the same as that of the brush.

If the child does not like his drawing, he can pick up the eraser, which will glow in a white light color when picked up, and start erasing the painting on the wall. While erasing, the eraser reacts to the speed of movement by changing intensity of the light. When the child is done with erasing, the eraser slowly fades out the color back into the white light.

To change the color of the paint, the child picks up the brush and dips it into the bucket and stirs. The color of the bucket (and brush) changes during the stirring clockwise and counter-clockwise. Once the desired color is found the child can start painting with the new color on the wall.

Another way the change to color of the paint is to place a colored object into the bucket. The bucket will then change its color into the color of the object.

If the child wants to bring his painting to life, he picks up the wand. The wand will glow. When he taps it onto the painting he just made the painting starts to slightly move to show its selection. After the tapping he can make a sound into the wand, which is pulsating in light to show that it is recording. The child then taps the drawing again and the drawing will start to animate and make the sound that was recorded.

When done with painting the child can then store all the tools back into the bucket, and by doing so deactivating all the tools, the bucket and the painting slowly fades away.

The following objects are available in this embodiment (other embodiments may have different objects):

Paint Bucket
   This is a wireless digital paint bucket with LED's on the inside. Stirring in the bucket with the "brush" can change the color of the LED's. By placing a colored object in the bucket the color of the LED's also changes.

Brush
   This is a small wireless digital paintbrush with LED's inside. By picking it up it will start to glow. By dipping this into the bucket, it will light up in the color of the bucket. This tool is then also is used to paint on the wall. Stirring in the bucket with the "brush" will change the color of the LED's.

Wand
   This is a small wireless magic wand with LED's inside. It is used to "bring paintings to life". By picking it up it will glow. By tapping a painting the wand will start to pulse its LED's indicating that a sound can be recorded. You can then make a sound into the wand and by tapping on to the painting again the painting starts to animate and make the sound that was recorded.

Eraser
   This is a small wireless digital eraser with LED's inside. By picking it up it will glow. By moving the eraser over the wall you erase a painting. The speed and motion of the erasing influences the intensity of the LED's. Effect is a flickering during the erasing.

Figure 3:
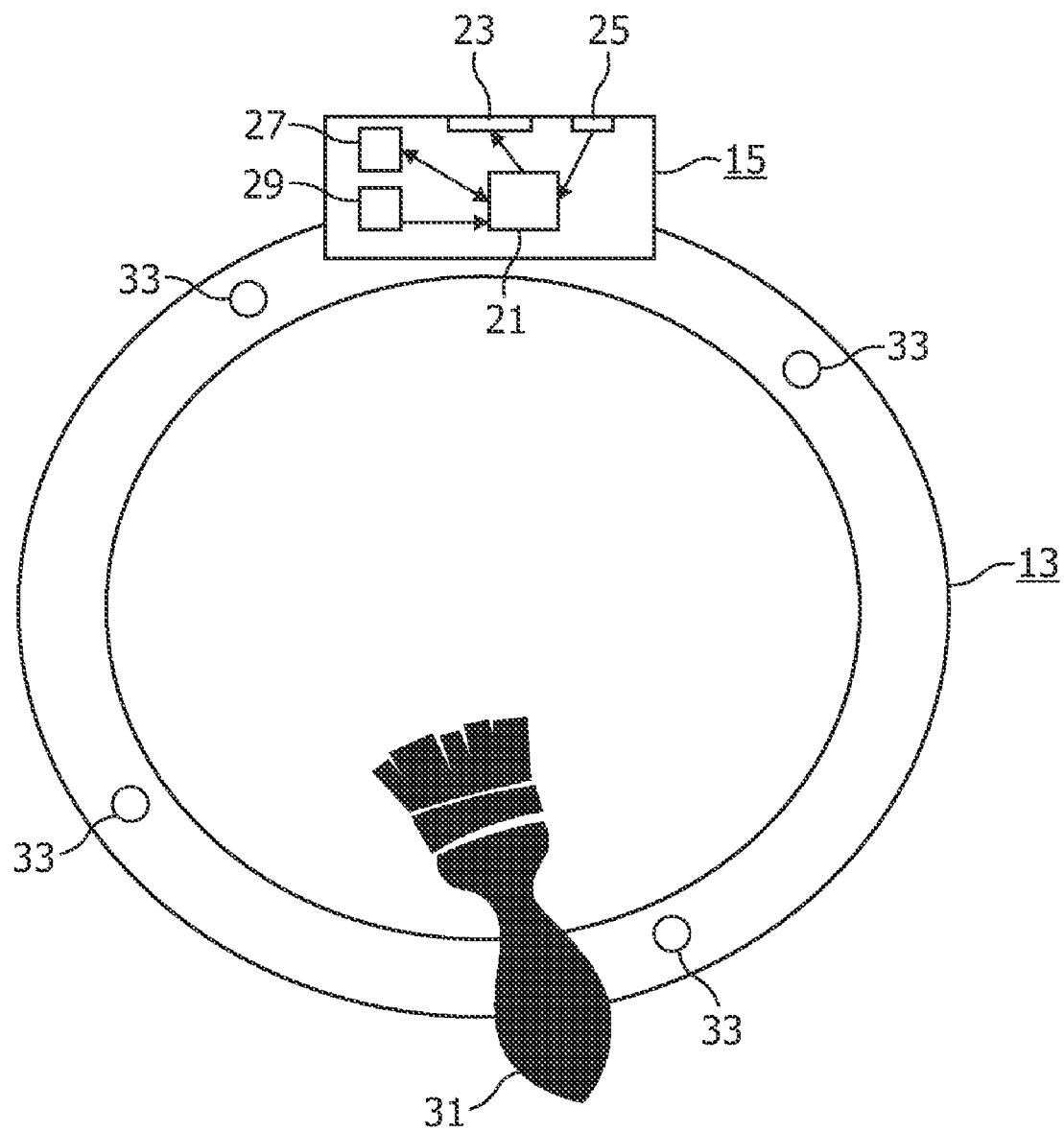
FIG. 3 shows a block diagram of the embodiment of FIG. 2.

The system 13 for virtually drawing on a physical surface of FIG. 3 comprises electronic circuitry 21. The electronic circuitry 21 is operative to detect movements of a physical object 31 over the physical surface and project a drawing corresponding to the movements on the physical surface. The electronic circuitry may comprise a general-purpose or application-specific processor. The system 13 is a bucket with four sensors 33 in its wall. The sensors 33 can detect a clockwise and/or counter-clockwise movement of the physical object 31 and change the color based on the detected movement. The sensors 33 may be Hall sensors and the physical object 31 may comprise a magnet.

In this embodiment, a module 15 is attached to an edge of the bucket. The module 15 comprises the electronic circuitry 31. The electronic circuitry 21 controls the projector 23 and receives input from a camera 25. Instead of the camera 25, another means could be used to detect the movements of the physical object 31, i.e. of the virtual paintbrush. The module 15 comprises means 29 for determining a position of the physical surface on which the drawing is currently being projected and a memory 27 for storing and retrieving a drawing associated with said position. This feature is also referred to as "virtual graffiti".

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A system for virtually drawing on a physical surface, comprising:
   electronic circuitry, the electronic circuitry being operative to:
   detect, via an input, movements of a physical object over the physical surface, wherein the physical object comprises a wireless digital paint brush with LED's, wherein responsive to the wireless digital paint brush being picked up, the LED's of the wireless digital paint brush glow;
   select a color for projecting in response to the wireless digital paint brush being dipped into a wireless digital paint bucket having LED's of a given color and the LED's of the wireless digital paint brush being configured to glow in the given color of the LED's of the wireless digital paint bucket; and
   project, via a projector operatively coupled with the wireless digital paint bucket, a virtual drawing on the physical surface, wherein the virtual drawing comprises shapes and colors corresponding to (i) movements of the wireless digital paint brush on the physical surface and (ii) a color of the wireless digital paint brush LED's at the time of respective movements.

2. The system as claimed in claim 1, further comprising the wireless digital paint bucket, the wireless digital paint bucket further for holding the physical object.

3. The system as claimed in claim 2, wherein the wireless digital paint bucket further comprises the projector for projecting the virtual drawing on the physical surface.

4. The system as claimed in claim 3, wherein the projector comprises a laser projector.

5. The system as claimed in claim 2, wherein the wireless digital paint bucket still further comprises a plurality of sensors for detecting a stirring gesture being performed with the physical object in the wireless digital paint bucket, wherein the electronic circuitry is further operative, in response to the stirring gesture, to select a color and to use that color during projecting of the virtual drawing corresponding to movements performed after the color has been selected.

6. The system as claimed in claim 1, further comprising:
   means for determining a position of the physical surface on which the virtual drawing is currently being projected; and
   a memory for storing and retrieving the virtual drawing associated with said position.

7. The system as claimed in claim 1, wherein the electronic circuitry is operative to animate the virtual drawing.

8. A non-transitory computer-readable medium embodied with a computer program comprising instructions executable by a programmable device for enabling the programmable device to function as the system of claim 1.

* * * * *